United States Patent
Cheng et al.

(10) Patent No.: US 9,357,343 B2
(45) Date of Patent: May 31, 2016

(54) NAVIGATION SYSTEM WITH CONTENT DELIVERY MECHANISM AND METHOD OF OPERATION THEREOF

(71) Applicant: Telenav, Inc., Sunnyvale, CA (US)

(72) Inventors: Pu Cheng, Fremont, CA (US); Feng Guo, Redwood City, CA (US)

(73) Assignee: TELENAV, INC., Santa Clara, CA (US)

( * ) Notice: Subject to any disclaimer, the term of this patent is extended or adjusted under 35 U.S.C. 154(b) by 0 days.

(21) Appl. No.: 14/337,690

(22) Filed: Jul. 22, 2014

(65) Prior Publication Data

US 2016/0029156 A1    Jan. 28, 2016

(51) Int. Cl.
*G01C 21/36* (2006.01)
*H04W 4/02* (2009.01)

(52) U.S. Cl.
CPC ............. *H04W 4/02* (2013.01); *G01C 21/3697* (2013.01)

(58) Field of Classification Search
USPC .................. 701/400–541; 340/988–990
See application file for complete search history.

(56) References Cited

U.S. PATENT DOCUMENTS

| | | | |
|---|---|---|---|
| 6,801,850 B1 * | 10/2004 | Wolfson | 701/410 |
| 8,458,102 B2 | 6/2013 | Bill | |
| 8,521,424 B2 * | 8/2013 | Schunder et al. | 701/452 |
| 8,621,374 B2 * | 12/2013 | Sheha et al. | 715/769 |
| 2004/0243430 A1 * | 12/2004 | Horstemeyer | 705/1 |
| 2010/0241496 A1 * | 9/2010 | Gupta et al. | 705/14.1 |
| 2011/0227757 A1 * | 9/2011 | Chen et al. | 340/902 |
| 2013/0117057 A1 * | 5/2013 | Van Moltke et al. | 705/7.13 |
| 2015/0032366 A1 * | 1/2015 | Man et al. | 701/412 |

* cited by examiner

*Primary Examiner* — Rami Khatib
*Assistant Examiner* — Timothy Nesley
(74) *Attorney, Agent, or Firm* — IP Investment Law Group (57) ABSTRACT

A method of operation of a navigation system includes: generating a time fence with a control unit based on a provider location relative to a travel waypoint; generating a notification based on the time fence meeting or below a tolerable time threshold; and communicating the notification based on a delivery type for providing on a device.

19 Claims, 5 Drawing Sheets

NAVIGATION SYSTEM WITH CONTENT DELIVERY MECHANISM AND METHOD OF OPERATION THEREOF

TECHNICAL FIELD

The present invention relates generally to a navigation system, and more particularly to a system with content delivery mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without content delivery mechanism to efficiently deliver content to user has become a paramount concern for the consumer. The inability decreases the benefit of using the tool.

Thus, a need still remains for a navigation system with content delivery mechanism to deliver content efficiently to the user. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a time fence with a control unit based on a provider location relative to a travel waypoint; generating a notification based on the time fence meeting or below a tolerable time threshold; and communicating the notification based on a delivery type for providing on a device.

The present invention provides a navigation system, including: a control unit for: generating a time fence based on a provider location relative to a travel waypoint, generating a notification based on the time fence meeting or below a tolerable time threshold, and a communication interface, coupled to the control unit, for communicating the notification based on a delivery type for providing on a device.

The present invention provides a navigation system having a non-transitory computer readable medium including instructions for execution, the instructions comprising: generating a time fence based on a provider location relative to a travel waypoint; generating a notification based on the time fence meeting or below a tolerable time threshold; and communicating the notification based on a delivery type for providing on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
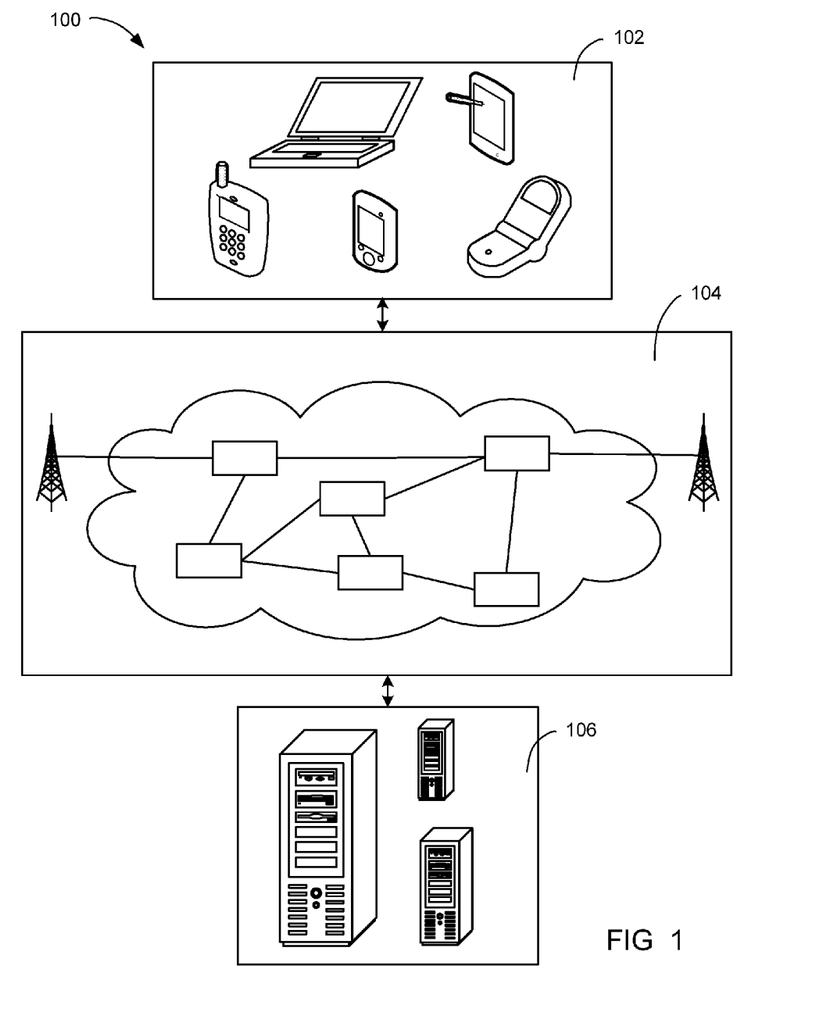
FIG. 1 is a navigation system with content delivery mechanism in an embodiment of the present invention.

Referring now to FIG. 1, therein is shown a navigation system 100 with content delivery mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
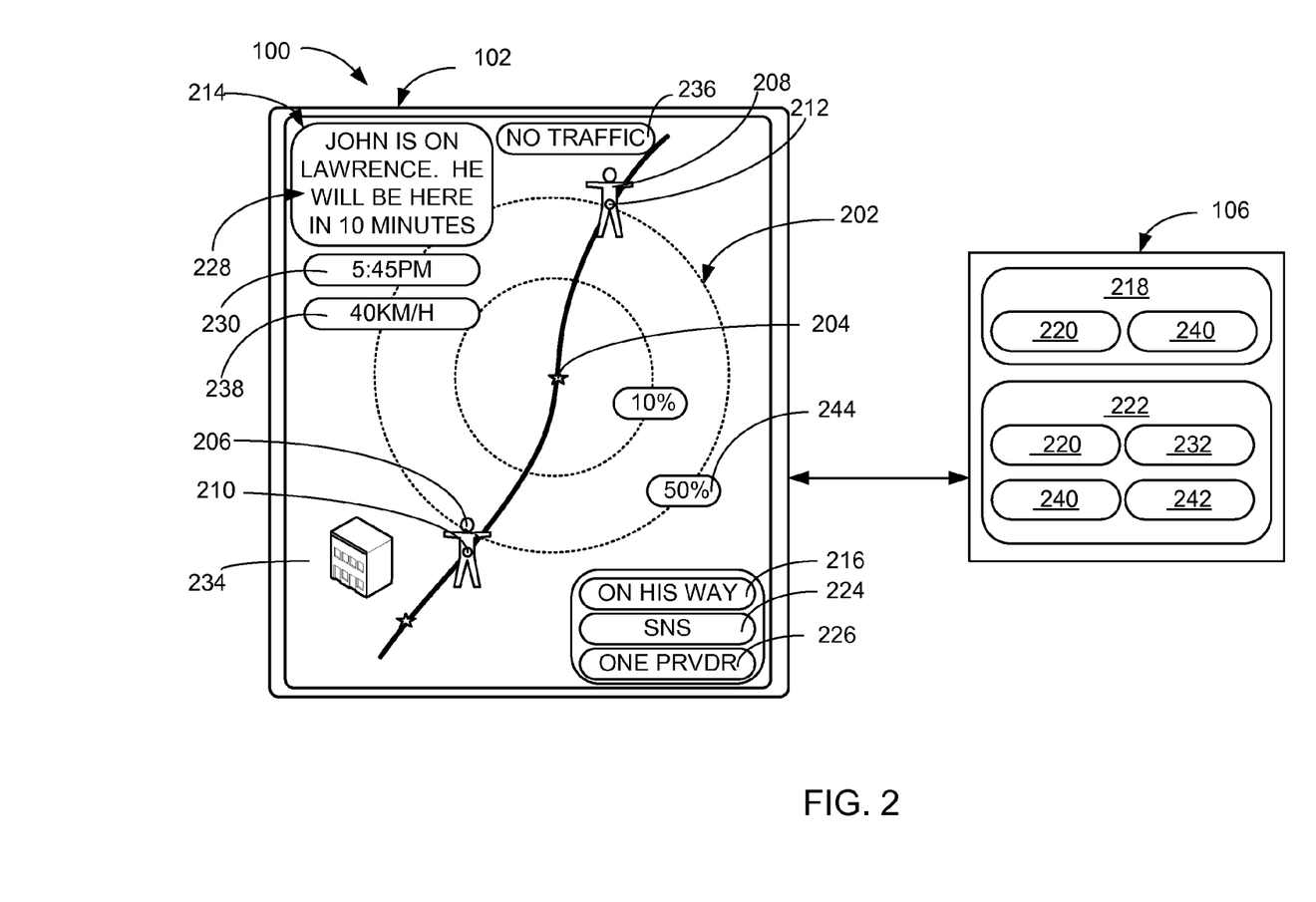
FIG. 2 is an example of a time fence.

Referring now to FIG. 2, there is shown an example of a time fence 202. For clarity and brevity, the discussion of the embodiment of the present invention will focus on the first device 102 delivering the result generated by the navigation system 100. However, various embodiments of the present invention can easily be applied with the description with the second device 106 of FIG. 1 and the first device 102 interchangeably.

The time fence 202 is defined as a time value for traveling. For example, the time fence 202 can represent a remaining travel time to reach a travel waypoint 204. For another example, the time fence 202 can represent the travel time from a provider location 206, a recipient location 208, or a combination thereof. More specifically, the time fence 202 can represent "5 minutes away" from the provider location 206 to the travel waypoint 204.

The travel waypoint 204 is defined as a physical location for travel to. For example, the travel waypoint 204 can represent a target destination, a rendezvous point, or a combination thereof for a provider 210, a recipient 212, or a combination thereof can meet. The provider location 206 is defined as a physical location of the provider 210. The recipient location 208 is defined as a physical location of the recipient 212. The travel waypoint 204 can include the provider location 206, the recipient location 208, or a combination thereof.

The provider 210 can represent a user triggering the navigation system 100 to communicate a notification 214 based on the time fence 202. The recipient 212 can represent a user receiving the notification 214. The notification 214 is defined as information to notify a travel status 216. The travel status 216 is defined as a state of user's travel. For example, the notification 214 can include the travel status 216 of the provider 210, the recipient 212, or a combination thereof for arriving at the travel waypoint 204. For another example, the notification 214 can include the travel status 216 to notify the first device 102 representing a thermostat to adjust the temperature of user's home based on the outside temperature, an arrival time 230, or a combination thereof. The arrival time 230 is defined as a time for arriving at the travel waypoint 204.

A provider profile 218 is defined as personal information regarding the provider 210. For example, the provider profile 218 can include cultural information 220, sex, age, gender, profession, or a combination thereof. A recipient profile 222 is defined as personal information regarding the recipient 212. For example, the recipient profile 222 can include cultural information 220, sex, age, gender, profession, or a combination thereof. The cultural information 220 can include the ethnicity, religion, country of origin, or a combination thereof of the provider 210, the recipient 212, or a combination thereof.

A delivery type 224 is defined as a type of mechanism to deliver the notification 214. For example, the delivery type 224 can include an email, a short message service, a phone call, a social network site message, or a combination thereof. A group size 226 can represent a number of people communicating the notification 214. For example, the group size 226 can represent a plurality of the provider 210 sending the notification 214, a plurality of the recipient receiving the notification 214, or a combination thereof.

The notification 214 can include a content level 228 of the travel status 216. The content level 228 is defined as a level of detail provided on the notification 214. For example, the content level 228 of the travel status 216 can include the provider location 206, the arrival time 230 of the provider 210, or a combination thereof.

A recipient priority 232 is defined as the level of importance of the recipient 212. For example, the higher the recipient priority 232 of the recipient 212, the greater the content level 228 in the notification 214 that the recipient 212 can receive. For another example, the lower the recipient priority 232, the less urgent the notification 214 can be communicated to the recipient 212.

A travel context 234 is defined as a situation or circumstance surrounding the user's travel. For example, the travel context 234 can include a traffic condition 236, a travel speed 238, an activity history 240, the provider location 206, the recipient location 208, the travel waypoint 204, or a combination thereof. The traffic condition 236 can represent no traffic, moderate traffic, heavy traffic, a deadlock, or a combination thereof. The travel speed 238 is defined as a travel rate for the user's travel. For example, the travel speed 238 can be represented by kilometers per hour. The activity history 240 is defined as a log of the user's activity. For example, the activity history 240 can include the travel context 234 which the provider 210 triggered the time fence 202 to communicate the notification 214. For a different example, the activity history 240 can include a pattern of activity for the recipient 212 receiving the notification 214.

A tolerable time threshold 242 is defined as amount of time tolerated. For example, the tolerable time threshold 242 can represent the maximum amount of travel time by the provider 210 to arrive at the travel waypoint 204 expected by the recipient 212. For another example, the tolerable time threshold 242 can represent the maximum amount of time tolerated by the recipient 212 for the provider 210 not notifying the whereabouts of the provider 210 with the notification 214.

For a specific example, the tolerable time threshold 242 for the recipient 212 can represent 10 minutes. The time fence 202 can represent 20 minutes for the provider 210 to reach the travel waypoint 204. The recipient 212 can tolerate the provider 210 for not communicating the notification 214 because the time fence 202 is still greater than the tolerable time threshold 242. In contrast, if the time fence 202 meets or below the tolerable time threshold 242, the recipient 212 can expect the notification 214 from the provider 210 for the travel status 216.

A difference level 244 is the amount or degree of difference between the tolerable time threshold 242 and the time fence 202. For example, the difference level 244 can be expressed in alphanumeric value, percentage value, or a combination thereof. For further example, if the time fence 202 and the tolerable time threshold 242 are equivalent, the difference level 244 can be 0%. For a different example, if the tolerable time threshold 242 can represent 30 minutes and the time fence 202 can represent 15 minutes, the difference level 244 can represent that the value of the tolerable time threshold 242 can represent twice the value of the time fence 202.

Figure 3:
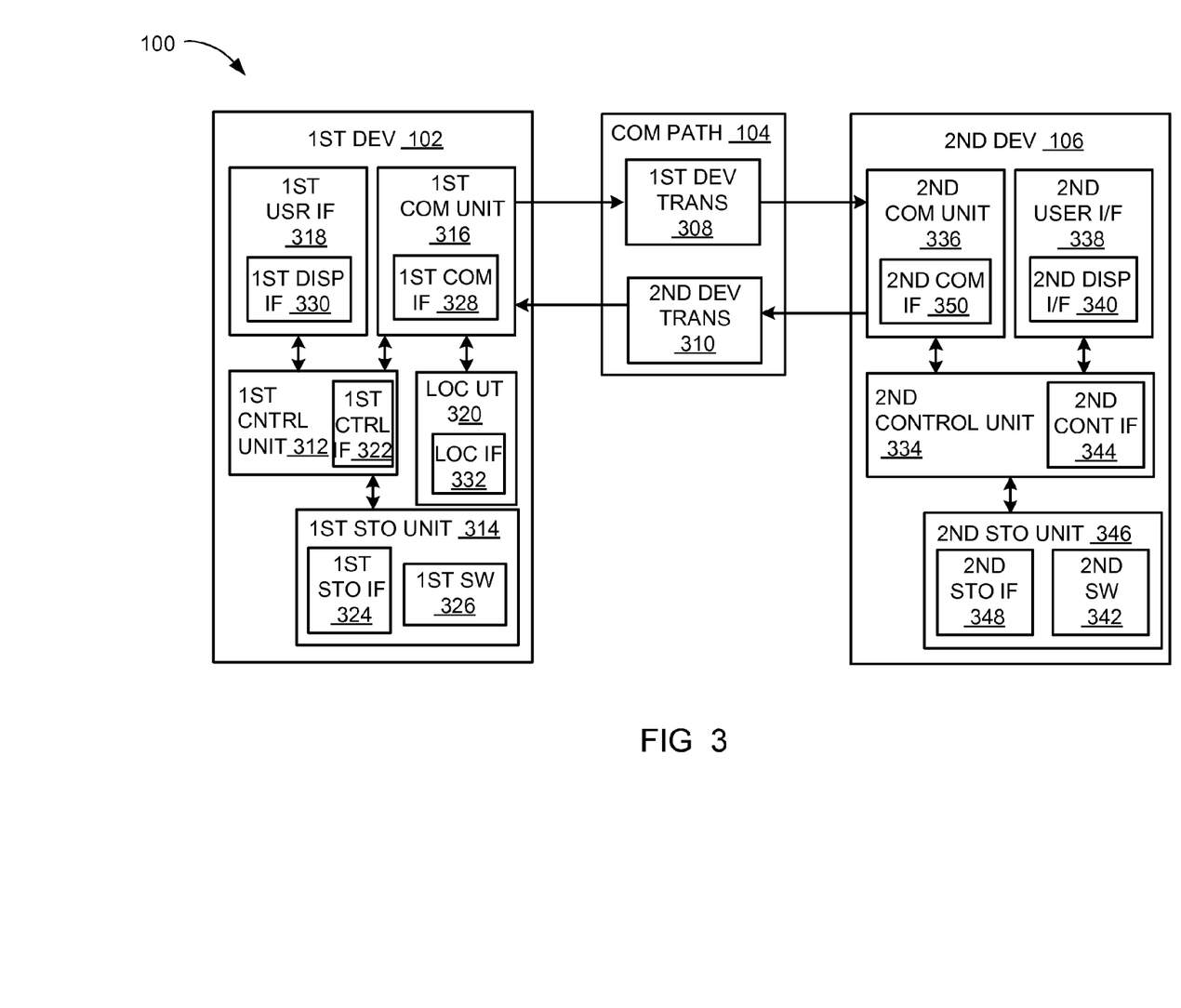
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations physically separate from the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations physically separate from the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations physically separate from the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, a camera, or any combination thereof to provide data and communication inputs.

The first user interface 318 can include a first display interface 330. The first display interface 330 can include a display, a projector, a video screen, a speaker, a headset, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, a camera, or any combination thereof to provide data and communication inputs. Examples of the output device of the second user interface 338 can include a second display interface 340. The second display interface 340 can include a display, a projector, a video screen, a speaker, a headset, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations physically separate from the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations physically separate from the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
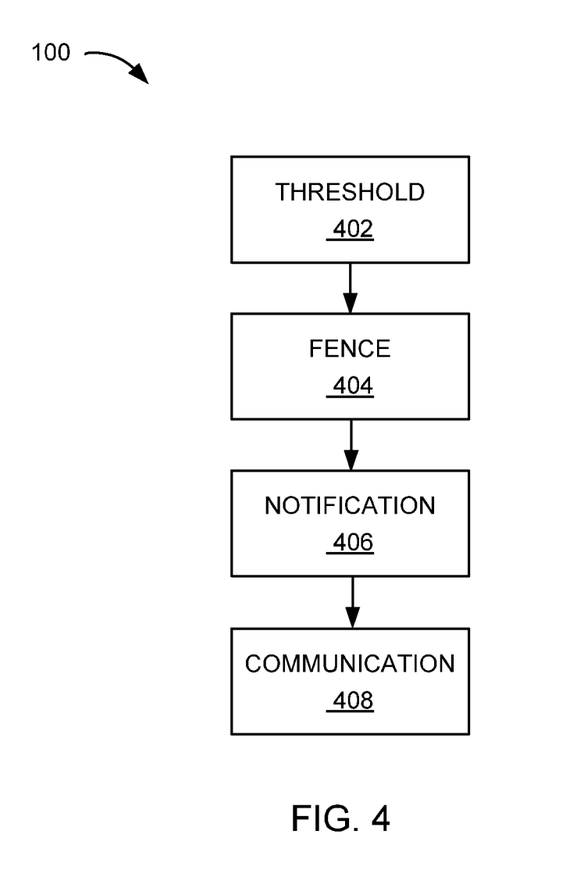
FIG. 4 is a control flow of the navigation system.

Referring now to FIG. 4, therein is shown a control flow of the navigation system 100. The navigation system 100 can include a threshold module 402. The threshold module 402 determines the tolerable time threshold 242 of FIG. 2. For example, the threshold module 402 can determine the tolerable time threshold 242 based on the provider profile 218 of FIG. 2, the recipient profile 222 of FIG. 2, or a combination thereof.

The threshold module 402 can determine the tolerable time threshold 242 in a number of ways. For example, the threshold module 402 can determine the tolerable time threshold 242 based on the provider profile 218. For example, the provider profile 218 can represent a pizza delivery person. The provider profile 218 can indicate that the pizza delivery advertised that the pizza will be delivered within 30 minutes guaranteed. The 30 minutes guaranteed delivery can be a well-known advertisement. Based on the provider profile 218, the threshold module 402 can determine the tolerable time threshold 242 to represent 30 minutes.

In contrast, the provider profile 218 can represent the user's boss from the user's workplace. The user's boss can have a tendency to be tardy. Further, the user may not be able to complain to the boss. Based on the provider profile 218, the threshold module 402 can determine the tolerable time threshold 242 to represent 60 minutes. More specifically, based on the provider profile 218, the threshold module 402 can determine one instance of the tolerable time threshold 242 different from another instance of the tolerable time threshold 242.

As an example, the threshold module 402 can determine a various instances of the tolerable time threshold 242 to change the time that the user can tolerate to wait to receive the notification 214 of FIG. 2. More specifically, the greater the time for the tolerable time threshold 242, the greater the tolerance that the user can permit. Stated differently, the higher the instance of the tolerable time threshold 242, the greater the tolerance that the user can permit for a delay.

For a different example, the threshold module 402 can determine the tolerable time threshold 242 based on the recipient profile 222. As discussed similarly above, the threshold module 402 can determine one instance of the tolerable time threshold 242 different from another instance of the tolerable time threshold 242 based on the recipient profile 222. For a specific example, if the recipient profile 222 is customer waiting for the pizza delivery, the threshold module 402 can determine the tolerable time threshold 242 to represent 30 minutes. In contrast, if the recipient profile 222 is a subordinate waiting for the arrival of the user's boss, the threshold module 402 can determine the tolerable time threshold 242 to represent 60 minutes.

For another example, the threshold module 402 can determine the tolerable time threshold 242 based on the travel context 234 of FIG. 2. More specifically, the travel context 234 can represent the traffic condition 236 of FIG. 2 that the provider 210 of FIG. 2 is currently traveling. The traffic condition 236 can represent heavy traffic. As a result, the threshold module 402 can determine the tolerable time threshold 242 to represent a higher instance than the tolerable time threshold 242 when the traffic condition 236 is no traffic as delay for arrival is likely expected.

For another example, the threshold module 402 can determine the tolerable time threshold 242 based on the cultural information 220 of FIG. 2. The provider profile 218, the recipient profile 222, or a combination thereof can include the cultural information 220. The threshold module 402 can determine the tolerable time threshold 242 based on the cultural information 220 for adjusting the tolerable time threshold 242.

More specifically, the provider profile 218 can include the cultural information 220 for one type of ethnicity. The provider 210 with the one type of ethnicity can have the cultural information 220 with the reputation of being not punctual. Based on the cultural information 220, the threshold module 402 can determine the tolerable time threshold 242 with a greater instance of the tolerable time threshold 242 than the provider profile 218 with the cultural information 220 of other type of ethnicity to accommodate for the frequent tardiness.

For a different example, the threshold module 402 can determine the tolerable time threshold 242 based on the provider location 206 of FIG. 2. For example, the provider location 206 can represent 10 kilometers away from the recipient location 208 of FIG. 2. The travel speed 238 of FIG. 2 of the provider 210 can present 40 kilometers per hour. Based on the provider location 206 and the travel speed 238, the threshold module 402 can determine the tolerable time threshold 242 to represent 15 minutes.

For another example, the threshold module 402 can determine the tolerable time threshold 242 based on the recipient location 208. For example, the recipient location 208 can represent 20 kilometers away from the travel waypoint 204 of FIG. 2. The provider location 206 can represent 10 kilometers away from the travel waypoint 204. The travel speed 238 for both the provider 210 and the recipient 212 of FIG. 2 can represent 40 kilometers per hour each. The threshold module 402 can determine the tolerable time threshold 242 based on the arrival time 230 of FIG. 2 of the provider 210 or the recipient 212 who will arrive later. More specifically, the threshold module 402 can determine the tolerable time threshold 242 to represent 30 minutes based on the arrival time 230 of the recipient 212 to the travel waypoint 204. Stated differently, the threshold module 402 can determine the tolerable time threshold 242 based on the arrival time 230 of later instance to arrive at the travel waypoint 204.

For another example, the threshold module 402 can determine the tolerable time threshold 242 based on the group size 226 of FIG. 2. More specifically, the group size 226 can represent a number of participants in a group of people including a plurality of the provider 210, the recipient 212, or a combination thereof. Based on the group size 226, the threshold module 402 can change the tolerable time threshold 242. For example, if a number of the provider 210 or the recipient 212 can represent two people, the threshold module 402 can increase or decrease the tolerable time threshold 242 to accommodate the possible difference in the arrival time 230 for arriving at the travel waypoint 204 by having a plurality of the provider 210, the recipient 212, or a combination thereof than if the tolerable time threshold 242 is based on one person.

For another example, the threshold module 402 can determine the tolerable time threshold 242 based on the activity history 240 of FIG. 2. More specifically, the activity history 240 can indicate the pattern of promptness, tardiness, or a combination thereof of the provider 210, the recipient 212, or a combination thereof. Based on the activity history 240, the threshold module 402 can change the tolerable time threshold 242 based on the activity history 240 to increase or decrease the tolerable time threshold 242.

For further example, the factors discussed to determine the tolerable time threshold 242 can be factored individually or combination thereof by the threshold module 402. The threshold module 402 can communicate the tolerable time threshold 242 to a fence module 404.

The navigation system 100 can include the fence module 404, which can couple to the threshold module 402. The fence module 404 generates the time fence 202 of FIG. 2. For example, the fence module 404 can generate the time fence 202 based on the recipient profile 222.

The fence module 404 can generate the time fence 202 in a number of ways. For example, the fence module 404 can generate the time fence 202 based on the provider location 206, the travel speed 238, the travel waypoint 204, or a combination thereof. More specifically, the provider location 206 can represent 25 kilometers away from the travel waypoint 204. The travel speed 238 can represent an average speed of 50 kilometers per hour. Based on the provider location 206, the travel speed 238, the travel waypoint 204, or a combination thereof, the fence module 404 can generate the time fence 202 to represent 30 minutes.

For a different example, the fence module 404 can generate the time fence 202 based on the provider profile 218, the recipient profile 222, or a combination thereof. More specifically, the provider profile 218 can represent a subordinate and the recipient profile 222 can represent the boss of the recipient 212. As a result, the fence module 404 can generate the time fence 202 similar to the time fence 202 determined based on the provider location 206, the travel speed 238, the travel waypoint 204, or a combination thereof to indicate the earnest attempt by the provider 210 to reach the travel waypoint 204.

In contrast, the provider profile 218 and the recipient profile 222 can indicate that the provider 210 and the recipient 212 are friends. The activity history 240 can indicate that the provider 210 has a tendency to be late to reach the travel waypoint 204. Based on the provider profile 218, the recipient profile 222, the activity history 240, or a combination thereof, the fence module 404 can generate the time fence 202 to be greater than if the time fence 202 was determined based on the provider location 206, the travel speed 238, the travel waypoint 204, or a combination thereof. More specifically, the fence module 404 can generate the time fence 202 having a greater value to accommodate the tardiness.

For another example, the fence module 404 can generate the time fence 202 based on the group size 226. Similarly as discussed above, the arrival time 230 of the provider 210 can differ based on the group size 226. More specifically, the fence module 404 can generate the time fence 202 based on the tardiest instance of the arrival time 230 amongst all the instances of the provider 210 arriving at the travel waypoint 204. The fence module 404 can generate the time fence 202 based on the time fence 202 based on the provider location 206, the travel speed 238, the travel waypoint 204, or a combination thereof with the tardiest instance of the arrival time 230.

For a different example, the fence module 404 can generate the time fence 202 based on the cultural information 220 for the provider profile 218, the recipient profile 222, or a combination thereof. The fence module 404 can generate the time fence 202 to be greater for one ethnicity than the time fence 202 of another ethnicity based on the activity history 240 of being tardy. More specifically, the fence module 404 can generate the time fence 202 can be increased or decreased to accommodate for the difference in the cultural information 220. The fence module 404 can communicate the time fence 202 to a notification module 406.

The navigation system 100 can include the notification module 406, which can couple to the fence module 404. The notification module 406 generates the notification 214. For example, the notification module 406 can generate the notification 214 based on the time fence 202, the tolerable time threshold 242, or a combination thereof to notify the provider location 206 to the recipient 212.

The notification module 406 can generate the notification 214 in a number of ways. For example, the notification module 406 can generate the notification 214 based on the time fence 202 meeting or below the tolerable time threshold 242. Stated differently, the notification module 406 can generate the notification 214 based on the tolerable time threshold 242 meeting or exceeding the time fence 202.

For further example, the tolerable time threshold 242 can represent 10 minutes. The time fence 202 can represent 15 minutes. The notification module 406 can generate the notification 214 based on the time fence 202 meeting or below the tolerable time threshold 242 to notify the recipient 212 of the delay caused by the provider 210 arriving at the travel waypoint 204.

It has been discovered that the navigation system 100 generating the notification 214 based on the time fence 202 meeting or below the tolerable time threshold 242 improves the efficiency of operating the navigation system 100, the first device 102, or a combination thereof. By controlling the generation of the notification 214 based on the time fence 202 meeting or below the tolerable time threshold 242, the navigation system 100 can avoid unnecessary allocation of resource to generate the notification 214. As a result, the navigation system 100 can reallocate the resource for other functionalities of the navigation system 100 to improve the safety of the user operating the first device 102, the navigation system 100, or a combination thereof.

For a different example, the notification module 406 can generate the notification 214 based on the difference level 244 of FIG. 2 between the time fence 202 and the tolerable time threshold 242. More specifically, the notification module 406 can generate the notification 214 based on the change in the difference level 244 between the time fence 202 and the tolerable time threshold 242 for notifying the recipient 212.

For a specific example, the difference level 244 can be based on a percentage difference between the time fence 202 and the tolerable time threshold 242. For example, if the time fence 202 and the tolerable time threshold 242 are equivalent, the difference level 244 can represent 0%. In contrast if the tolerable time threshold 242 can represent 30 minutes while the time fence 202 can represent 60 minutes, the difference level 244 can represent 100%. Stated differently, the tolerable time threshold 242 can be half as much the time value of the time fence 202.

For further example, the notification module 406 can generate the notification 214 based on various instances of the difference level 244 to accommodate the level of urgency for notifying the recipient 212. More specifically, the notification module 406 can change the delivery type 224 of FIG. 2, the content level 228 of FIG. 2, or a combination thereof of the notification 214 based on the difference level 244. For example, the notification module 406 can generate the notification 214 with the delivery type 224 of an email if the difference level 244 is at 100% to remind the recipient 212 that the provider 210 is on his or her way.

As the difference level 244 between the time fence 202 and the tolerable time threshold 242 diminishes, the notification module 406 can change the delivery type 224, the content level 228, or a combination thereof to accommodate for the increase in urgency level. For example, the notification module 406 can change the delivery type 224 from an email to a short message service if the difference level 244 decreases to 40%. The content level 228 can be changed to include a hyperlink having the information regarding the current location of the provider location 206 in the short message service. The notification module 406 can change the delivery type 224 representing a phone call if the difference level 244 decreases to 10% or under to notify the recipient 212 more urgently.

It has been discovered that the navigation system 100 generating the notification based on the difference level 244 improves the safety of the user operating the first device 102, the navigation system 100, or a combination thereof. More specifically, by triggering the generation of the navigation system 100 at different instance of the difference level 244, the navigation system 100 can improve efficiency of delivering the notification 214 by changing the delivery type 224, the content level 228, or a combination thereof. As a result, the navigation system 100 can notify the recipient 212 more efficiently for a safer operation of the first device 102, the navigation system 100, or a combination thereof.

For another example, the notification module 406 can generate the notification 214 based on the recipient priority 232. More specifically, the notification module 406 can change the delivery type 224, the content level 228, or a combination thereof based on the recipient priority 232. For a specific example, the recipient 212 can have the recipient profile 222 of the user's boss, thus, having the highest instance of the recipient priority 232. The notification module 406 can generate the notification 214 with the delivery type 224 of short message service with the in depth information for the content level 228 based on the recipient priority 232 to notify the travel status 216 of the provider 210, the recipient 212, or a combination thereof. In contrast, if the recipient 212 represents the recipient profile 222 with the user's acquaintance, the recipient priority 232 can represent the lowest instance. As a result, the notification module 406 can generate the notification 214 with the content level 228 of minimal amount of information based on the recipient priority 232

It has been discovered that the navigation system 100 generating the notification based on the recipient priority 232 improves the efficiency of delivering the notification 214. More specifically, based on the recipient priority 232, the navigation system 100 can change the delivery type 224, the content level 228, or a combination thereof. As a result, the navigation system 100 can improve the efficiency of delivering the notification 214 based on who the recipient 212 is.

For further example, the notification module 406 can also change the delivery type 224, the content level 228, or a combination thereof when the difference level 244 becomes a negative value. More specifically, if the tolerable time threshold 242 exceeds the time fence 202, the difference level 244 can represent a negative value. The notification module 406 can generate the notification 214 including the content level 228 with more details than if the difference level 244 was a positive value. The notification module 406 can communicate the notification 214 to a communication module 408.

For illustrative purposes, the navigation system 100 is described with the fence module 404 generating the time fence 202 based on various factors, although the fence module 404 can operate differently. For example, the fence module 404 can generate the time fence 202 based on the difference level 244.

More specifically, the fence module 404 can generate a plurality of the time fence 202 based on a plurality of the difference level 244. For example, the fence module 404 can generate the time fence 202 based on a plurality of the difference level 244 at 10% interval. First, the fence module 404 can generate the time fence 202 when the difference level 244 is at 100%. The fence module 404 can also generate a plurality of the time fence 202 when the difference level 244 is at 90%, 80%, 70%, 50%, 40%, 30%, 30%, 20%, and 10%.

It has been discovered that the navigation system 100 generating a plurality of the time fence 202 based on a plurality of the difference level 244 can improve the efficiency of delivering the notification 214. By having the time fence 202 generated at different instances of the difference level 244, the navigation system 100 can maximize the delivery of the notification to the recipient 212. As a result, the navigation system 100 can improve the safety of operating the first device 102, the navigation system 100, or a combination thereof.

The navigation system 100 can include the communication module 408, which can couple to the notification module 406. The communication module 408 communicates the notification 214. For example, the communication module 408 can communicate the notification 214 based on the group size 226.

The communication module 408 can communicate the notification 214 in a number of ways. For example, the group size 226 can represent a plurality of the provider 210, the recipient 212, or a combination thereof. For a specific example, a number of the provider 210 can represent more than one and the recipient 212 can represent one. The communication module 408 can communicate the one instance of the notification 214 of a plurality of the notification 214 to the one instance of the recipient 212. For a different example, a number of the recipient 212 can represent more than one and the provider 210 can represent one. The communication module 408 can communicate the notification 214 to a plurality of the recipient 212.

For another example, the communication module 408 can communicate the notification 214 based on the time fence 202, the difference level 244, the delivery type 224, the recipient priority 232 of FIG. 2, or a combination thereof. For a specific example, a plurality of the time fence 202 can be generated at different instances of the difference level 244. The communication module 408 can communicate the notification 214 based on each instances of the time fence 202.

For further example, the communication module 408 can communicate the notification 214 with a different instance of the delivery type 224 at each instance of the time fence 202. Moreover, the communication module 408 can communicate the notification 214 based on the recipient priority 232. More specifically, depending on the recipient priority 232, some of the recipient 212 will receive the notification 214 triggered by a certain instance of the time fence 202 while some of the recipient 212 will not receive the notification 214.

For example, a plurality of the recipient 212 can represent a user's boss, user's colleague, or a combination thereof. The communication module 408 can communicate the notification 214 triggered by each instance of the time fence 202 if the recipient profile 222 represents the user's boss based on the highest instance of the recipient priority 232. In contrast, the communication module 408 can communicate the notification 214 less frequently to the recipient 212 having a lower instance of the recipient priority 232. More specifically, the communication module 408 can communicate the notification 214 when the difference level 244 can represent 0% for the recipient 212 with the recipient profile 222 of user's colleague.

It has been discovered that the navigation system 100 communicating the notification 214 based on the time fence 202, the difference level 244, the delivery type 224, the recipient priority 232, or a combination thereof improves the efficiency of delivering the notification 214. By tailoring the delivery according to the recipient priority 232, the navigation system 100 can efficiently allocate the resource for communicating the notification 214 with various instances of the delivery type 224. As a result, the navigation system 100 can improve the safety of the user operating the navigation system 100, the first device 102, or a combination thereof.

The physical transformation from moving from the provider location 206, the recipient location 208, or a combination thereof to the travel waypoint 204 results in the movement in the physical world, such as people using the first device 102, the vehicle, or a combination thereof, based on the operation of the navigation system 100. As the movement in the physical world occurs, the movement itself creates additional information that is converted back into determining the tolerable time threshold 242, the time fence 202, the notification 214, or a combination thereof for the continued operation of the navigation system 100 and to continue the movement in the physical world.

The first software 326 of FIG. 3 of the first device 102 of FIG. 3 can include the modules for the navigation system 100. For example, the first software 326 can include the threshold module 402, the fence module 404, the notification module 406, and the communication module 408.

The first control unit 312 of FIG. 3 can execute the first software 326 for the threshold module 402 to determine the tolerable time threshold 242. The first control unit 312 can execute the first software 326 for the fence module 404 to generate the time fence 202. The first control unit 312 can execute the first software 326 for the notification module 406 to generate the notification 214. The first control unit 312 can execute the first software 326 for the communication module 408 to communicate the notification 214.

The second software 342 of FIG. 3 of the first device 106 of FIG. 3 can include the modules for the navigation system 100. For example, the second software 342 can include the threshold module 402, the fence module 404, the notification module 406, and the communication module 408.

The second control unit 334 of FIG. 3 can execute the second software 342 for the threshold module 402 to determine the tolerable time threshold 242. The second control unit 334 can execute the second software 342 for the fence module 404 to generate the time fence 202. The second control unit 334 can execute the second software 342 for the notification module 406 to generate the notification 214. The second control unit 334 can execute the second software 342 for the communication module 408 to communicate the notification 214.

The modules of the navigation system 100 can be partitioned between the first software 326 and the second software 342. The second software 342 can include the threshold module 402, the fence module 404, and the notification module 406. The second control unit 334 can execute modules partitioned on the second software 342 as previously described.

The first software 326 can include the communication module 408. Based on the size of the first storage unit 314, the first software 326 can include additional modules of the navigation system 100. The first control unit 312 can execute the modules partitioned on the first software 326 as previously described.

The first control unit 312 can operate the first communication interface 328 of FIG. 3 to communicate the tolerable time threshold 242, the time fence 202, the notification 214, or a combination thereof to or from the second device 106. The first control unit 312 can operate the first software 326 to operate the location unit 320 of FIG. 3. The second control unit 334 can operate the second communication interface 350 of FIG. 3 to communicate the tolerable time threshold 242, the time fence 202, the notification 214, or a combination thereof to or from the first device 102 through the communication path 104 of FIG. 3.

The first control unit 312 can operate the first user interface 318 of FIG. 3, the second user interface 338 of FIG. 3, or a combination thereof to display the provider location 206, the recipient location 208, a travel waypoint 204, a route, a geographic region, or a combination thereof. More specifically, the first user interface 318, the second user interface 338, or a combination thereof can display the digital depiction of the provider location 206, the recipient location 208, a travel waypoint 204, a route, a geographic region, or a combination thereof to represent the physical world.

The navigation system 100 describes the module functions or order as an example. The modules can be partitioned differently. For example, the notification module 406 and the communication module 408 can be combined. Each of the modules can operate individually and independently of the other modules. Furthermore, data generated in one module can be used by another module without being directly coupled to each other. For example, the notification module 406 can receive the tolerable time threshold 242 from the threshold module 402. Further, "communicating" can represent sending, receiving, or a combination thereof the data generated to or from one to another.

The modules described in this application can be hardware implementation or hardware accelerators in the first control unit 312 or in the second control unit 334. The modules can also be hardware implementation or hardware accelerators within the first device 102 or the second device 106 but outside of the first control unit 312 or the second control unit 334, respectively as depicted in FIG. 3. However, it is understood that the first control unit 312, the second control unit 334, or a combination thereof can collectively refer to all hardware accelerators for the modules.

The modules described in this application can be implemented as instructions stored on a non-transitory computer readable medium to be executed by the first control unit 312, the second control unit 334, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 5:
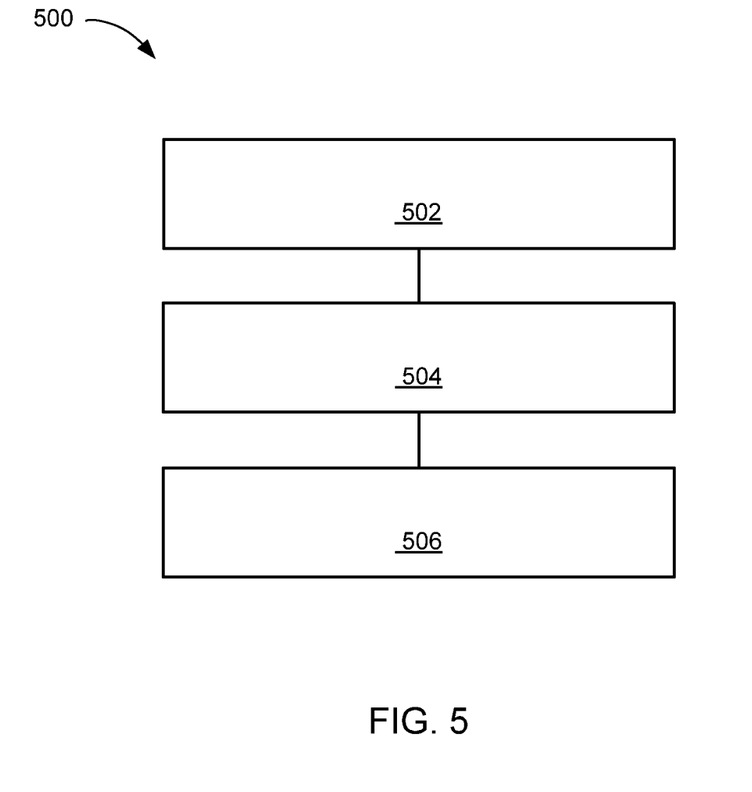
FIG. 5 is a flow chart of a method of operation of the navigation system in a further embodiment of the present invention.

Referring now to FIG. 5, therein is shown a flow chart of a method 500 of operation of the navigation system 100 in a further embodiment of the present invention. The method 500 includes: generating a time fence with a control unit based on a provider location relative to a travel waypoint in a block 502; generating a notification based on the time fence meeting or below a tolerable time threshold in a block 504; and communicating the notification based on a delivery type for providing on a device in a block 506.

It has been discovered that the navigation system 100 generating the time fence 202 based on the provider location n206 relative to the travel waypoint 204 improves the efficiency and safety of the user operating the navigation system 100, the first device 102, or a combination thereof. By generating the time fence 202, the navigation system 100 can generate the notification 214 based on the time fence 202 meeting or below the tolerable time threshold 242. As a result, the navigation system 100 can communicate the notification 214 based on the delivery type 224 for improving the efficiency and the safety of the user.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating a time fence with a control unit based on a provider location relative to a travel waypoint;
   generating a notification based on the time fence meeting or below a tolerable time threshold; and
   communicating the notification based on a delivery type and a recipient priority for controlling the notification delivered to a device.

2. The method as claimed in claim 1 further comprising determining the tolerable time threshold based on a travel context for controlling the notification delivered to a recipient.

3. The method as claimed in claim 1 further comprising determining the tolerable time threshold based on a provider profile, a recipient profile, or a combination thereof for controlling the notification delivered to a recipient.

4. The method as claimed in claim 1 wherein generating the notification includes generating the notification based on a difference level between the time fence and the tolerable time threshold for controlling the notification delivered to a recipient.

5. The method as claimed in claim 1 wherein generating the notification includes generating the notification based on the recipient priority for changing the delivery type.

6. The method as claimed in claim 1 wherein generating the time fence includes generating the time fence based on a group size for controlling the notification delivered to a recipient.

7. The method as claimed in claim 1 wherein generating the time fence includes generating a plurality of the time fence based on each instances of a difference level between the time fence and the tolerable time threshold.

8. The method as claimed in claim 1 further comprising changing the delivery type of the notification based on a difference level between the time fence and the tolerable time threshold.

9. The method as claimed in claim 1 wherein communicating the notification includes communicating the notification based on a group size for controlling the notification delivered to a recipient.

10. A navigation system comprising:
    a control unit for:
       generating a time fence based on a provider location relative to a travel waypoint,
       generating a notification based on the time fence meeting or below a tolerable time threshold, and
    a communication interface, coupled to the control unit, for communicating the notification based on a delivery type and a recipient priority for controlling the notification delivered to a device.

11. The system as claimed in claim 10 wherein the control unit is for determining the tolerable time threshold based on a travel context for controlling the notification delivered to a recipient.

12. The system as claimed in claim 10 wherein the control unit is for determining the tolerable time threshold based on a provider profile, a recipient profile, or a combination thereof for controlling the notification delivered to a recipient.

13. The system as claimed in claim 10 wherein the control unit is for generating the notification based on a difference level between the time fence and the tolerable time threshold for controlling the notification delivered to a recipient.

14. The system as claimed in claim 10 wherein the control unit is for generating the notification based on the recipient priority for changing the delivery type.

15. A non-transitory computer readable medium including instructions for execution, the instructions comprising:
    generating a time fence based on a provider location relative to a travel waypoint;
    generating a notification based on the time fence meeting or below a tolerable time threshold; and
    communicating the notification based on a delivery type and a recipient priority for controlling the notification delivered to a device.

16. The non-transitory computer readable medium as claimed in claim 15 further comprising determining the tolerable time threshold based on a travel context for controlling the notification delivered to a recipient.

17. The non-transitory computer readable medium as claimed in claim 15 further comprising determining the tolerable time threshold based on a provider profile, a recipient profile, or a combination thereof for controlling the notification delivered to a recipient.

18. The non-transitory computer readable medium as claimed in claim 15 wherein generating the notification includes generating the notification based on a difference level between the time fence and the tolerable time threshold for controlling the notification delivered to a recipient.

19. The non-transitory computer readable medium as claimed in claim 15 wherein generating the notification includes generating the notification based on the recipient priority for changing the delivery type.

* * * * *